Sept. 11, 1956　　　　S. D. POOL ET AL　　　　2,762,491
CANE HARVESTING MACHINE

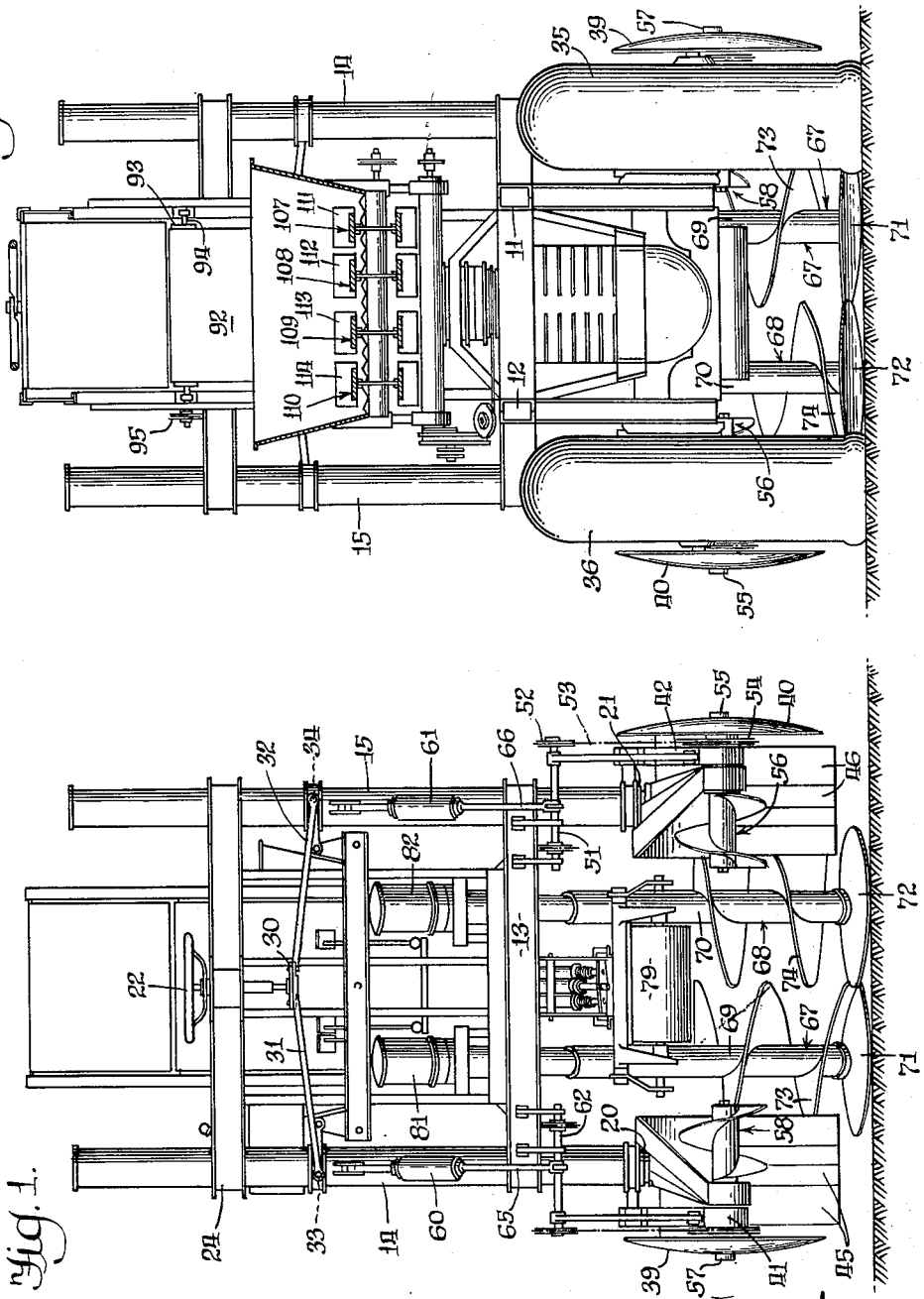

Original Filed March 4, 1952　　　　　　　　5 Sheets-Sheet 2

Inventors.
Stuart D. Pool
Elof K. Karlsson
Paul O. Pippel
Atty.

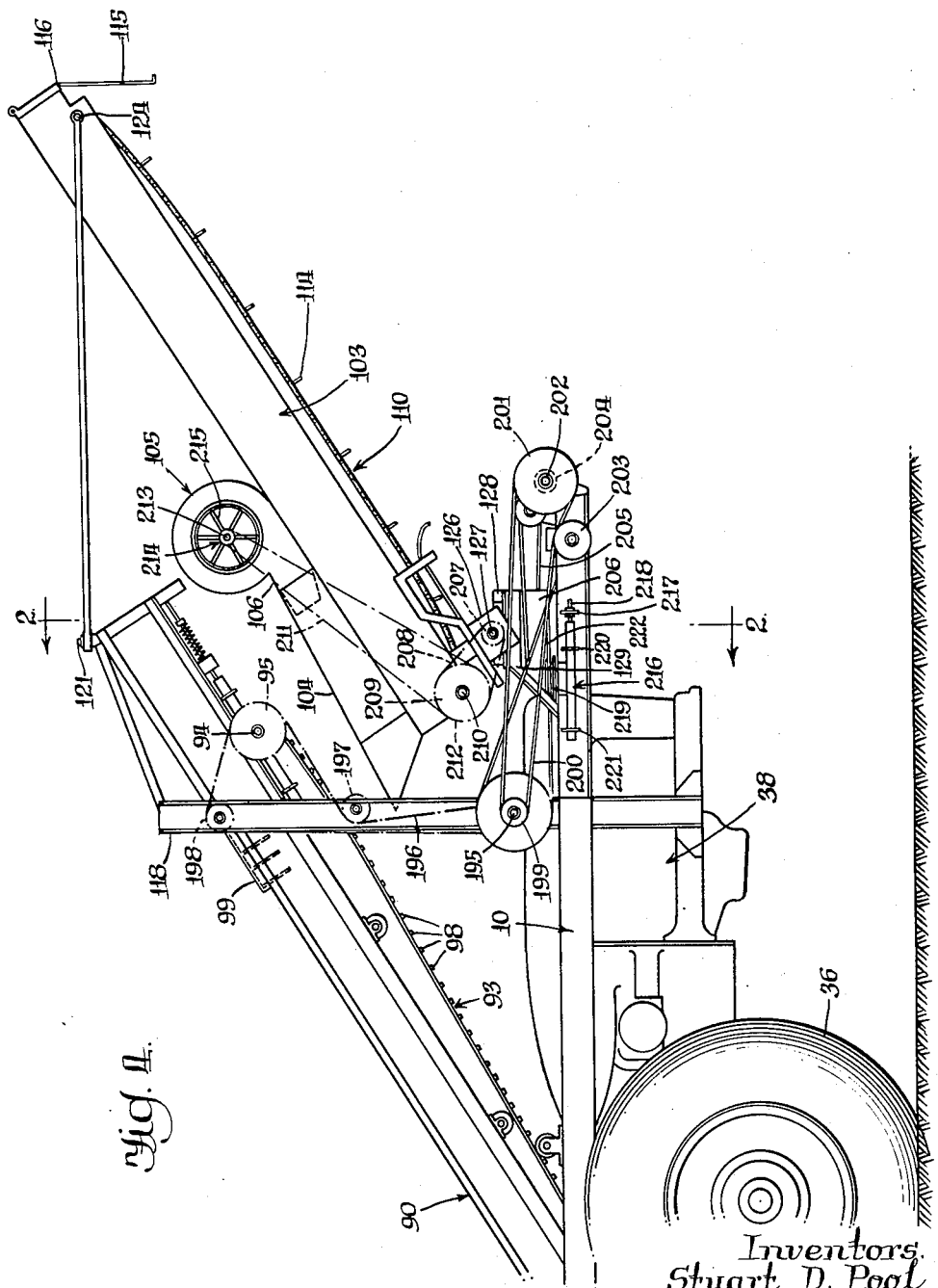

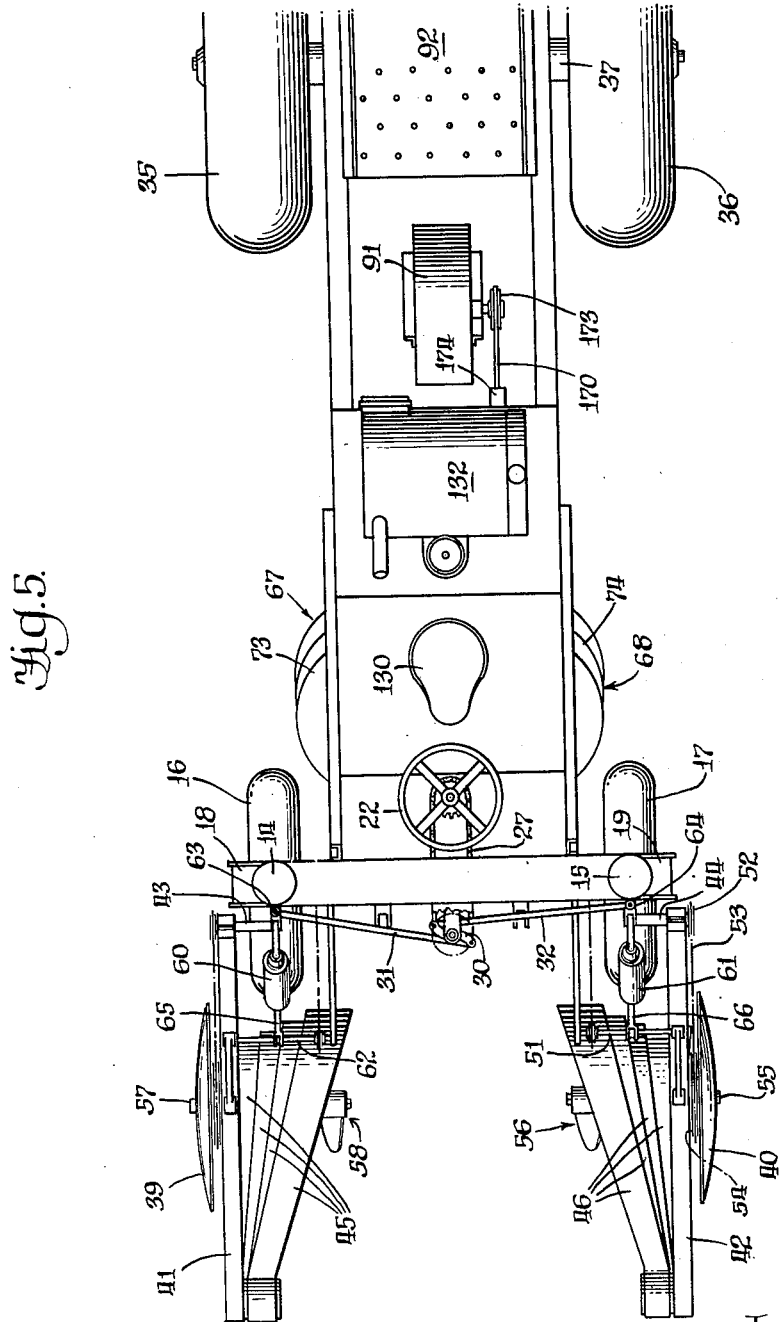

Sept. 11, 1956   S. D. POOL ET AL   2,762,491
CANE HARVESTING MACHINE
Original Filed March 4, 1952   5 Sheets-Sheet 5
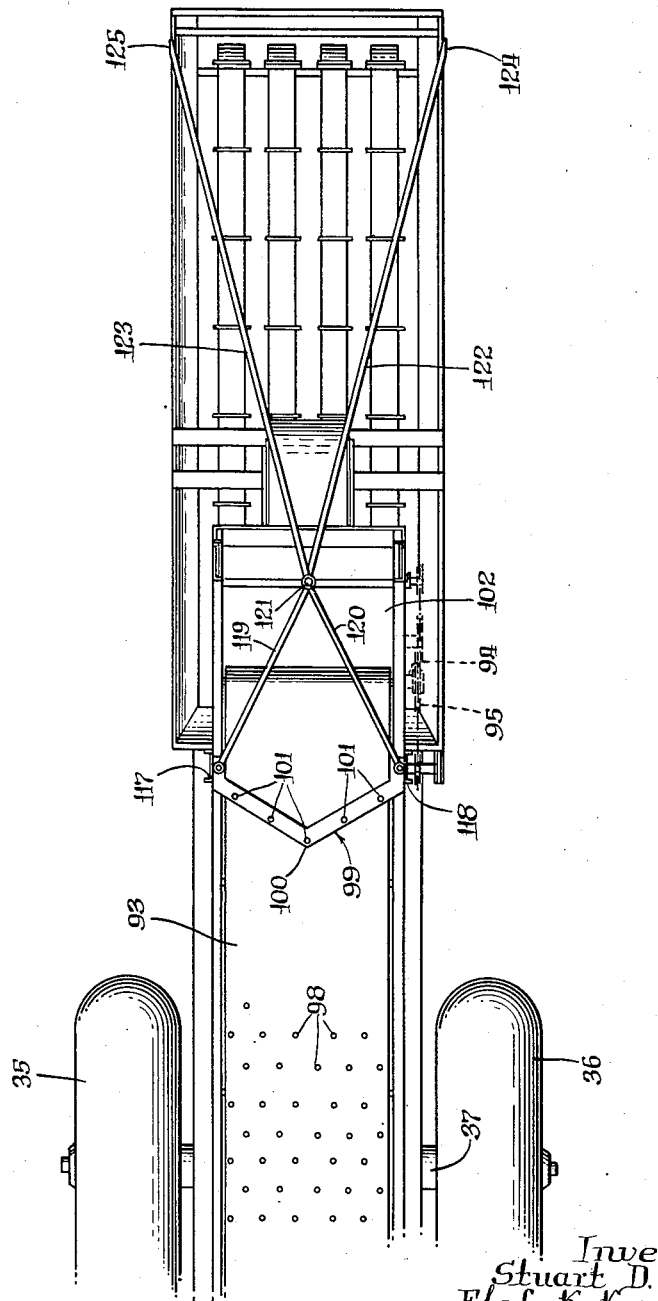

United States Patent Office 2,762,491
Patented Sept. 11, 1956

2,762,491

CANE HARVESTING MACHINE

Stuart D. Pool and Elof K. Karlsson, Moline, Ill., assignors to International Harvester Company, a corporation of New Jersey Original application March 4, 1952, Serial No. 274,798. Divided and this application March 29, 1955, Serial No. 497,660

2 Claims. (Cl. 198—102)

This invention relates to a new and improved wagon elevator for harvesting machines and is a division of our co-pending application entitled "Cane Harvesting Machine" having Serial No. 274,798 filed March 4, 1952 and now Patent No. 2,716,322.

An important object of this invention is to supply a wagon elevator mechanism for a harvesting machine in which a pair of elevators are arranged in series and in which the first elevator comprises an endless belt type conveyor with a plurality of projections thereon and the second elevator comprises a plurality of side-by-side chain conveyors with intermittently spaced paddles thereon and wherein the adjacent paddles of the plurality of chain conveyors are entirely separate.

A still further important object of this invention is to provide wagon elevator means for a harvester including first and second elevators arranged in series and cleaning fan means associated with each of the elevators for effecting a cleaner crop for delivery to a wagon.

Another and still further important object of this invention is the provision of means in a crop harvesting machine for delivering harvested and treated crops to a trailing truck or wagon by means of two elevators, the first of which is stationary and the second of which is hingedly mounted for lateral swinging to effect a discharge of the crop material to either side or to the rear of the harvester.

Still another object of this invention is to provide means on a harvester wagon elevator for uniformly spreading crop material over the full width of the elevator.

Another important object of this invention is to equip an elevator for harvesting machines with a V-shaped rake member for enabling the spreading of harvested material being elevated substantially uniformly over the full width of the elevator.

Another and still further important object of this invention is to supply an elevator for harvesting machines comprising a plurality of side-by-side slatted chain conveyors operating independently of one another.

Other and further important objects of this invention will become apparent from the disclosures in the following specification and accompanying drawings.

In the drawings:

Fig. 1 is a front elevational view of the cane harvester of this invention.

Fig. 2 is a sectional view taken on the line 2—2 of Fig. 4.

Fig. 4 is a side elevational view of the complementary part of the cane harvester not shown in Fig. 3.

Fig. 5 is a top plan view of the front portion of the cane harvester, and

Fig. 6 is a top plan view of the rearward portion of the cane harvester.

Figure 3:
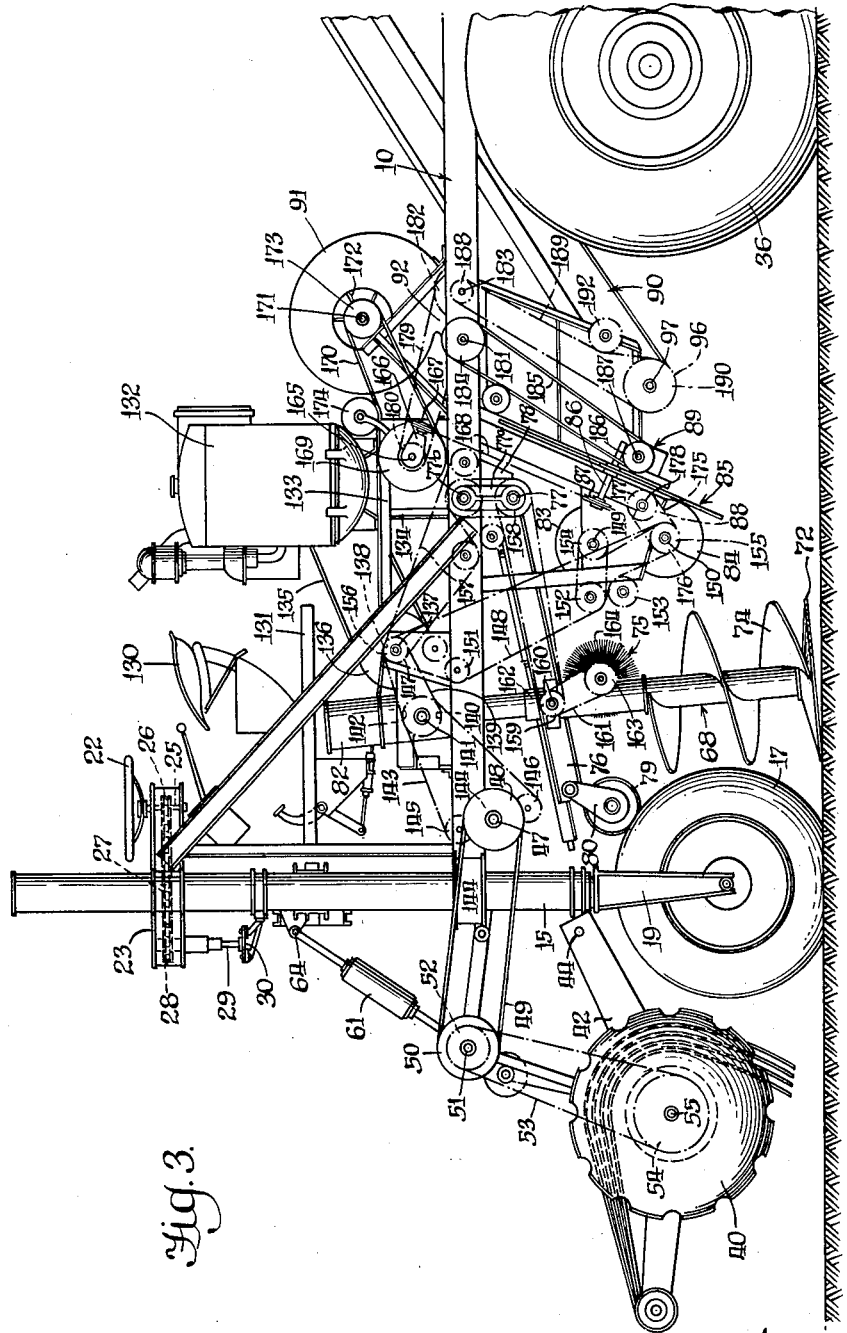
Fig. 3 is a side elevational view of the front part of the cane harvester.

It should be noted that Figs. 3 and 4, when combined constitute a complete side elevational view of the cane harvester and that Figs. 5 and 6, when combined, comprise a complete top plan view of the cane harvester.

As shown in the drawings:

The reference numeral 10 indicates generally a frame structure being generally longitudinally disposed and comprising the main frame for carrying the cane harvesting elements of this invention. The frame 10 includes laterally spaced apart side beams 11 and 12 and a cross tie member 13 at the forward end thereof. The tie frame member 13 journally receives laterally spaced apart vertically disposed tubular pipe members 14 and 15. Spaced apart wheels 16 and 17 are carried by the pipe members 14 and 15 respectively. The wheels 16 and 17 are journally mounted in fork members 18 and 19 which are provided with vertically extending post members 20 and 21 for projecting upwardly into the pipes 14 and 15 respectively for relative rotation therewith. It should be understood that the dirigible wheels 16 and 17 have vertical movement together with the pipe members 14 and 15 but have relative rotational movement with respect to the pipes. As best shown in Figs. 1 and 3 a steering wheel 22 is mounted on a frame bracket 23 affixed to a cross frame member 24 spaced upwardly from the front frame member 13 of the main frame 10. The pipes 14 and 15 are simlarly journally mounted within the lateral ends of the cross frame 24. The steering wheel 22 is adapted to rotate a shaft 25 and simultaneously a sprocket 26. A chain 27 disposed in a fore and aft position is adapted to extend around the sprocket 26 and around a sprocket 28 journalled on the forward end of the frame bracket 23. A shaft 29 is driven by the sprocket 28 and is adapted to rotate the actuating member 30 as shown in Figs. 3 and 5. Link members 31 and 32 are adapted to join the outer ends of the actuating member 30 and extend laterally outwardly to terminating positions adjacent the vertically disposed pipes 14 and 15 respectively. Pin members 33 and 34 are fastened to the outer ends of the link arm 31 and 32 and project through slots in the pipes 14 and 15 for direct engagement with the vertically disposed shafts 20 and 21 mounted within the pipes. It will thus be apparent that as the steering wheel 22 is rotated the dirigible wheels 16 and 17 will also be rotated giving the harvesting machine of this invention ready maneuverability through a field of standing cane. Large traction wheels 35 and 36 are adapted to carry the primary load of the main frame 10 and are disposed forwardly of the rearward end of the frame at a position slightly rearwardly of the center between the ends thereof. The traction wheels as shown in Figs. 5 and 6 are mounted on a cross axle 37. An engine 38 is mounted on the frame 10 projecting rearwardly from the traction wheels 35 and 36. The engine 38 is arranged and constructed to impart rotational drive to the traction wheels 35 and 36 to thus propel the cane harvester of this invention.

Cane is generally planted in rows and the plants form stools from which a plurality of stalks grow to a substantial height. The great height of the stalks makes them susceptible to being blown over by wind or storms. As a result the rows of cane become considerably interentwined, and many of the cane stalks lie on the ground in a mat-like formation. It is therefore an essential part of any cane harvester to clearly define or separate the rows of cane prior to the harvesting thereof. In the present invention this is accomplished by improved row divider or defining means such as shown in our copending application, Serial No. 267,526, filed Jan. 22, 1952, and now Patent No. 2,667,727. The divider mechanism includes vertically disposed disk cutters 39 and 40 which are carried on forwardly extending frame members 41 and 42 respectively. The frame members are mounted on cross shafts 43 and 44 for vertical hinging movement thereabout. The row dividers further include a plurality of lapped spring finger members 45 and 46 on each of the spaced apart units, and as shown in Fig. 3 the spring fingers 45 and 46 are adapted to scrape the ground and force the down cane stalks up into the scope of the cutting disks 39 and 40. These disks 39 and 40 are rotated at a substantial rate of speed by reason of drive from the driven shaft 47. The pulley 48 is mounted on the shaft 47, and with the aid of a V-belt 49 rotational drive of the pulley 48 is imparted to a V-pulley 50 which, in turn, is mounted on a transversely disposed shaft 51. A sprocket 52 is mounted on the shaft 51 and thus rotates concurrently with the rotation of the shaft 51 and the V-pulley 50. A chain 53 is positioned around the sprocket 52 and extends downwardly and forwardly to a sprocket 54 which is mounted on a shaft 55 carrying the cutting disk 40. As best shown in Fig. 5 the chain 53 is positioned laterally inside the rotating cutter auger 40. Rotation of the shaft 55 also causes rotation of an open end auger conveyor 56 which is mounted thereon. The auger 56 has its screw flight commencing adjacent the cutter disk 40 and terminating in an unjournalled end adjacent the innermost end of the spring fingers 46. It will be thus apparent that as the cane harvester of this invention proceeds through a field of standing and down cane that the cane will be clearly defined or separated into spaced rows after which the harvesting elements of the machine may cut the stalks. The row divider units are identically constructed and include all of the same elements except for the fact that they are oppositely disposed and are arranged and constructed to feed crop material inwardly toward each other. The cutting disk 39 is mounted on a cross shaft 57 and an auger 58 having an unjournalled inner end is mounted for rotation with the shaft 57. The detail construction of the divider unit is fully described in our copending application. Some vertical adjustment of the divider units may be required and hence separate hydraulic units 60 and 61 are arranged and constructed to effect vertical swinging movement about the cross shafts 43 and 44 by reason of engagement with the shaft 51 and the shaft 62 on the opposing divider unit. The hydraulic units 60 and 61 are anchored at their upper ends as shown at 63 and 64. The extensible and contracting pistons 60 and 61 engage the shafts 62 and 51 respectively and thus indirectly effect the vertical positioning of the frame arms 41 and 42.

As best shown in Fig. 2, the harvesting unit is located directly behind the dirigible wheels 16 and 17 and substantially between the two spaced wheels. The harvesting unit includes a pair of side-by-side intercalated upright augers 67 and 68. The augers are equipped with central shaft members 69 and 70. The lower ends of the shafts are each provided with circular cutting disks 71 and 72 which cooperate with each other to effect a shearing of standing cane stalks at the ground line. The spiral flights 73 and 74 of the respective augers 67 and 68 are adapted to elevate the severed stalks and deliver them upwardly into engagement with a rotating cylindrical brush 75. This particular auger harvesting means is described more fully in the following copending patent applications: Serial No. 133,018, filed Dec. 15, 1949, and now Patent No. 2,648,943; and Serial No. 254,604, filed Nov. 2, 1951. The substantially vertically disposed and slightly forwardly inclined augers 67 and 68 are carried intermediate the ends of arm means 76 hinged on shaft 77 which is suspended within a link 77a depending from a hinged connection at 77b to the main frame 10. Bracket 78 is a rear stop for link 77a when augers 67 and 68 hit a rock or other obstruction. In normal operating position there is clearance between link 77a and bracket 78. The forward end of the hinged arm means 76 carries a stalk depressing roller 79 by means of bracket arms 80. The augers 67 and 68 are equipped with driving means 81 and 82 respectively, as best shown in my copending application Serial No. 254,604, filed Nov. 2, 1951.

As the cane harvester of this invention is propelled by operation of the engine 38 through a field of cane, the cane is clearly defined into separate rows by reason of the divider elements disposed forwardly of the dirigible wheels 16 and 17 and narrowed by reason of the lapped ground dragging springs 45 and 46 and the cooperative inwardly projecting augers 58 and 56. The stalk bending roll 79 is adapted to push the standing stalks forwardly at their upper ends, thus leaving the butt ends of the stalks available for cutting by the cooperative cutting disks 71 and 72. Immediately upon the stalks being severed from the root stools, the butt ends and any down cane, regardless of position, are elevated by the cooperative auger flights 73 and 74 whereupon the rotating brush 75 delivers the stalks rearwardly in a substantially horizontal plane into a pair of cooperative rotating feed rolls 83 and 84. These rolls rotate at a relatively high rate of speed and continue to propel the stalks in a horizontal plane through an area immediately to the rear of the feed rolls 83 and 84 which is regularly interrupted by the passage of a rotating chopper element 85.

The rotating cutter 85 constitutes a rotor having a central shaft 86 which is driven by means of a sprocket 87. Horizontally disposed and longitudinally spaced rolls 88 and 89 are arranged to rotate inwardly and downwardly adjacent the front and rear of the rotating cutter 85. The rolls 88 and 89 cooperate with the rotor cutter 85 to effect a stripping of the leaf material from the stalks prior to the time when the short lengths of cut stalks are propelled onto a first wagon elevator 90. A fan 91 is carried on the frame 10 and is adapted to direct a blast of air through a discharge nozzle 92 over the rotor cutter 85 causing any trash material to be blown downwardly and out the bottom of the cane harvester. This mechanism is shown in greater detail in our copending application Serial No. 235,441, filed July 6, 1951, and now Patent No. 2,723,667.

The first wagon elevator 90 is provided with a belt type conveyor 93 carried around spaced pulleys located at the lower and upper ends of the elevator 90. The upper pulleys (not shown) are mounted on a shaft 94. The shaft carries a sprocket 95 to effect rotation of the shaft and thus the pulleys for imparting movement to the belt 93. Lower pulleys 96 are mounted on a shaft 97. The belt 93 is provided with a plurality of spaced projections, lugs, or buttons 98 over the surface thereof to insure the upward carrying of the cut and cleaned cane stalks. A rake 99 is disposed over the upper end of the first elevator 90 and is arranged and constructed in a substantial V-shape as shown in Fig. 6 wherein an apex 100 is inclined downwardly and forwardly toward the front end of the machine. A plurality of depending rake tines or fingers 101 project downwardly from the V-shaped rake member 99 into the path of the cut cane stalks as they are moved upwardly by the buttons 98 on the belt conveyor 92. The rake is arranged to evenly spread the load of cut cane stalks uniformly over the full width of the belt so that upon delivery through the discharge spout 102 the cut cane will be substantially uniformly delivered over the full width of the second wagon elevator 103. It should be understood that the first elevator 90 must of necessity operate at a speed commensurate with the speed of delivery of the cut stalks as they are propelled onto the conveyor. In the event the first elevator 90 is not capable of removing the stalks substantially as fast as they are delivered thereto, the cut pieces will have a tendency to fall downwardly out of the bottom opening between the feed rolls 83 and 84 and the beginning of the wagon elevator 90.

The cut stalks after being carried upwardly and rearwardly by the first elevator 90 are thereafter dropped by gravity vertically downwardly into a hopper 104 of the second elevator 103. A fan 105 is carried on the elevator 103 above and rearwardly of the hopper 104 so that the discharge spout thereof 106 may direct a blast of air across the top of the hopper 104 whereupon any trash material that may have reached this point will be blown forwardly over the lower end of the hopper 104 for discharge to the ground. The second elevator 103 is arranged and constructed to deliver the harvested and cut crop to a trailing truck or wagon. The conveyor within the second elevator 103 comprises a plurality of laterally spaced apart side-by-side separate conveyors 107, 108, 109, and 110. Each of the conveyors is of the chain type and at regular intervals therearound is provided with paddles 111, 112, 113, and 114 for the purpose of aggressively delivering the cut cane stalks upwardly and rearwardly to the upper rearward end of the second elevator 103. The separate conveyors 107 to 110 inclusive provide a more flexible conveyor for the elevation of the relatively hard short lengths of cane stalk. The upper end of the second elevator 103 has a depending baffle plate 115 which is hinged at 116 whereby the harvested cane will be deflected downwardly as it is discharged from the second elevator 103 to a wagon or the like.

Vertical frame members 117 and 118 in the form of channel members are carried by the main frame 10 at a position adjacent the lower end of the second elevator. The upper end of the first elevator is carried by the spaced frame members 117 and 118. The upper frame members 117 and 118 carry tie rods 119 and 120 which come to a common center at 121 whereafter continuations of the tie rods extend rearwardly as shown at 122 and 123 for attachment at the rear and upper end of the second elevator at 124 and 125.

The lower end of the second elevator is provided with a downwardly depending bracket 126 which is adapted to carry a transversely disposed shaft 127 about which the second wagon elevator 103 may have vertical swinging movement for control of the height of discharge of the second elevator. The bracket 126 is carried on a turn-table 128 so that the second elevator 103 may have lateral rotating swinging movement whereby the harvested cane may be discharged to either side of the cane harvester or to the rear thereof as desired. The turn-table 128 is mounted on a stationary frame 129 which is carried on the main frame 10.

An operator for the cane harvester of this invention sits in a seat 130 provided therefor. The seat is mounted on a platform 131 and is arranged so that the operator may easily control the steering wheel 22 and may have access to the controls for operation of the ground propelling engine 38 and for an engine 132 arranged and constructed to impart drive to all of the harvesting elements. The engine 132 is mounted on a frame 133 which in turn is carried on the main frame 10 by reason of the supporting posts 134. Drive from the engine 132 is taken off by a V-belt 135 to a V-pulley 136. The pulley 136 is mounted on a shaft 137 which carries a sprocket 138. A chain 139 is driven by the sprocket 138 and imparts rotation to a sprocket 140 mounted on the shaft 141. Rotational drive is thus delivered to the augers 67 and 68. A second sprocket 142 on the shaft 141 carries a chain 143 for imparting rotational drive to a sprocket 144 mounted on the shaft 47 whereby rotational drive is delivered to the crop divider elements disposed forwardly of the steerable wheels 16 and 17. Spaced idler sprockets 145 and 146 insure proper rotational drive for the shaft 47.

A second sprocket 147 on the shaft 137 carries a chain 148 for delivery of rotational movement to the feed rolls 83 and 84. The feed roll 83 is carried on a shaft 149 and similarly the feed roll 84 is carried on a shaft 150. The chain 148 with the aid of idler sprockets 151, 152, and 153 is adapted to cause rotation of sprockets 154 and 155 in opposite directions to one another wherein their central opposing surfaces move in a direction from front to rear of the cane harvester.

A third sprocket 156 is mounted on the shaft 137 and by means of the chain 157 rotational drive is delivered to a sprocket 158 on the shaft 77 and thence to a sprocket 159 on a shaft 160. The cylindrical brush 75 is adapted to be rotated by means of a chain 161 delivering rotational power from a second sprocket 162 on the shaft 160 to a sprocket 163 on the brush shaft 164. The engine 132 also delivers rotational drive to the shaft 165 where by means of suitable gearing within a case 166 the sprocket 167 disposed at right angles to the shaft 165 is capable of delivering through means of a chain 168 rotational drive to the sprocket 87 which, as previously stated cause rotation of the chopping rotor 85.

The shaft 165 carries a V-pulley 169 for causing drive of a V-belt 170. The cleaning fan housing 91 has a shaft 171 on which the fan rotor 172 is mounted in the interior thereof. A V-pulley 173 is affixed to the shaft 171 outside of the fan housing 91 and receives the V-belt 170. An idler pulley 174 maintains proper tautness for the V-belt 170 which delivers rotational movement from the V-pulley 169 to the V-pulley 173.

The downwardly pulling trash rolls 88 and 89 are separately rotatably driven. The trash roll 88 receives its rotational drive from a chain 175 extending from a sprocket 176 on the shaft 150 to a sprocket 177 on the roll shaft 178. Because of the intermediate passing of the rotor chopper 85, it is necessary that the trash roll 89 be driven from a source rearwardly of the chopper 85. A chain 179 is driven from a sprocket 180 on the shaft 165 and delivers rotational movement to the shaft 181 and a sprocket 182 carried on the shaft 183. A V-pulley 184 is mounted on the shaft 181 and by reason of a V-belt 185 drive is delivered downwardly to a V-pulley 186 mounted on the shaft 187 of the trash roll 89.

A sprocket 188 is mounted on the shaft 183 and by means of the chain 189 engine drive is delivered to a sprocket 190 mounted on the shaft 97. An idler sprocket 192 insures the proper tension of the chain 189. The first elevator belt conveyor 92 is utilized for the purpose of transmitting drive from the engine 132 rearwardly to the second elevator and the cleaning fan 105.

The belt 92 is adapted to impart rotational drive to the shaft 195 carried on the supporting frame member 118. A sprocket, not shown, on the shaft 195 carries a chain 196 for receiving drive from the sprocket 95 on the pulley shaft 94. Idler sprockets 197 and 198 insure proper direction of rotation of the shaft 195.

A V-pulley 199 receives a V-belt 200 for delivery of rotational drive rearwardly to a V-pulley 201 mounted on a shaft 202 journally carried on the supporting frame 10 at the rearmost end. An idler pulley 203 maintains the V-belt 200 sufficiently taut to transmit rotational movement. A second V-belt pulley 204 is mounted on the shaft 202 and carries a V-belt 205 for delivery to the gear housing 206. Gear mechanism, not shown, is adapted to impart rotational drive to the shaft 127 which as shown in Fig. 4 constitutes the axis about which the second wagon elevator 103 has vertical hinging movement. A sprocket 207 is carried on the shaft 127 and by means of a chain 208 rotational drive is carried to the sprocket 209. The sprocket 209 is affixed to a shaft 210 which carries the set of sprockets, not shown, for the side-by-side plurality of conveyors 107 to 110 inclusive within the second elevator. A chain 211 is disposed between another sprocket 212 on the shaft 210 and a sprocket 213 on the shaft 214 of the second cleaning fan 105. The fan rotor 215 is mounted on the shaft 214.

Rotation of the second elevator 103 about its supporting base is accomplished by means of a hydraulic cylinder 216. A stationary bracket 217 is mounted on the main frame 10 and is fixedly attached to the cylinder piston 218 so that the cylinder proper 216 moves longitudinally fore and aft of the main frame 10. The cylinder 216 lies tangentially to the drum-like turn-table 128. A cable anchor member 219 is affixed to the hydraulic cylinder 216 and as the cylinder 216 slides longitudinally through the spaced bearing members 220 and 221 the cable anchor member 219 is similarly longitudinally moved. A cable 222 is fastened to the anchor member 219 and is adapted to effect rotation of the turn-table 128 in either direction thereof depending upon direction of movement of the cylinder 216.

In operation the cane harvester of this invention is adapted to pass through a field of cane and, as previously stated, clearly separate adjacent rows and deliver material to a relatively narrow row for handling by the cooperating auger harvesting elements. The stalks are then severed at substantial ground level whereafter they are elevated into a substantially horizontal plane at which time they are delivered rearwardly at a relatively high rate of speed into the path of a rotating cutter. The cutter is adapted to perform the dual function of cutting the relatively long stalks into short regular lengths and simultaneously cleaning the stalks of all leaves and trash thereon. At the same time the stalks are being cut and cleaned an auxiliary cleaning fan is arranged to deliver a blast of air across the cutting location just prior to the entry of the harvester and cut cane stalks into the first wagon elevator. The elevator thereafter causes the harvester and cut cane stalks to be delivered upwardly and rearwardly. The V rake member disposed at the upper end of the first elevator levels the cane to a uniform depth over the full width of the button projecting endless belt whereupon delivery from the first elevator to the second elevator is relatively uniform over the full width thus insuring that the operation of the second wagon elevator 103 will be most efficient in its operation. The second auxiliary cleaning fan 105 discharges a blast of air through the cane material as it falls from the first to the second elevator thus providing additional means for gaining a clean crop. The cane material is then elevated by the second elevator and discharged after striking the hinged baffle 115 into a trailing wagon or the like.

The lateral disposition of the second wagon elevator is controlled by the hydraulic cylinder 216. The operator is equipped with controls, not shown, for effecting delivery or withdrawal of fluid from either end of the cylinder 216 whereby the operator is capable of effecting rotation of the second wagon elevator 103. It should be noted that the axis of the supporting struts as shown at 121 is in alignment with the axial center of the turn-table 128 so that there is no binding of the second elevator 103 as it rotates therearound.

Numerous details of construction may be varied throughout a wide range without departing from the principles disclosed herein and we therefore do not propose limiting the patent granted hereon otherwise than as necessitated by the appended claims.

What is claimed is:

1. In a harvester having a frame, and wagon elevating means on said frame, said wagon elevating means including a first inclined elevator conveyor on said frame having a low forwardly disposed receiving end arranged and constructed to receive crops and an upper rearwardly disposed discharge end, a second inclined elevator conveyor on said frame positioned generally rearwardly of said first inclined elevator conveyor, said second inclined elevator conveyor having a low forwardly disposed hopper receiving end positioned substantially beneath said upper rearwardly disposed discharge end of the first inclined elevator conveyor and higher than the low forwardly disposed receiving end of the first inclined elevator conveyor, said second elevator conveyor having a relatively high discharge end, means provided on said first elevator conveyor for uniformly spreading crop material over the full width thereof, said means for uniformly spreading crop material including a V-shaped rake disposed over said first elevator conveyor adjacent the upper end thereof, and the apex of the V-shaped rake positioned downwardly over the center of said first elevator conveyor beneath the side arms of said V-shaped rake.

2. A relatively wide inclined crop elevator comprising a frame structure, an endless conveyor mounted on said frame structure and disposed in an inclined position wherein the top surface of the endless conveyor is adapted to feed crop material upwardly in an inclined direction, means mounted on said frame structure and over said endless conveyor for uniformly spreading the crop material over the full width thereof, said means for uniformly spreading the crop material including a V-shaped rake, and the apex of the V-shaped rake positioned in a direction downwardly of the inclining endless conveyor and the side arms of the V-shaped rake extending laterally outwardly and upwardly of the apex in the direction of incline of the endless conveyor.

References Cited in the file of this patent

UNITED STATES PATENTS

| Number | Name | Date |
|---|---|---|
| 264,703 | Jones | Sept. 19, 1882 |
| 959,679 | Wunder | May 31, 1910 |
| 1,201,412 | Williams | Oct. 17, 1916 |
| 2,458,713 | Linderer | Jan. 18, 1946 |